US012003040B2

(12) United States Patent
Foglia Manzillo et al.

(10) Patent No.: US 12,003,040 B2
(45) Date of Patent: Jun. 4, 2024

(54) TRANSMITARRAY ANTENNA CELL

(71) Applicant: Commissariat à l'Energie Atomique et aux Energies Alternatives, Paris (FR)

(72) Inventors: Francesco Foglia Manzillo, Grenoble (FR); Antonio Clemente, Grenoble (FR); Maciej Smierzchalski, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 283 days.

(21) Appl. No.: 17/660,849

(22) Filed: Apr. 27, 2022

(65) Prior Publication Data

US 2022/0359982 A1 Nov. 10, 2022

(30) Foreign Application Priority Data

May 7, 2021 (FR) ...................................... 2104867

(51) Int. Cl.
*H01Q 3/46* (2006.01)
*H01Q 1/28* (2006.01)
*H01Q 15/02* (2006.01)
*H01Q 15/24* (2006.01)
*H01Q 19/06* (2006.01)

(52) U.S. Cl.
CPC ............... *H01Q 3/46* (2013.01); *H01Q 15/02* (2013.01); *H01Q 15/242* (2013.01); *H01Q 19/06* (2013.01); *H01Q 1/288* (2013.01)

(58) Field of Classification Search
CPC ........... H01Q 1/288; H01Q 3/44; H01Q 3/46; H01Q 15/02; H01Q 15/24; H01Q 15/242; H01Q 15/244; H01Q 15/246; H01Q 19/06; H01Q 21/24; H01Q 21/245
See application file for complete search history.

(56) References Cited

U.S. PATENT DOCUMENTS

2013/0271346 A1* 10/2013 Dussopt ................. H01Q 3/247 343/893
2018/0301807 A1* 10/2018 Clemente ................. H01Q 3/34
2021/0234269 A1* 7/2021 Vilenskiy ................. H01Q 3/36

FOREIGN PATENT DOCUMENTS

WO 2012085067 A1 6/2012

OTHER PUBLICATIONS

Preliminary Search Report for French Application No. 2104867 dated Dec. 6, 2021, 3 pages.
I. Munina et al., "A Study of C-Band 1-Bit Reconfigurable Dual-Polarized Transmitarray," 13th European Conference on Antennas and Propagation (EuCAP 2019), Mar. 31, 2019, 5 pages.
F. Foglia Manzillo et al., "P-i-n Diode Based Electronically Steerable Transmitarrays for SOTM at Ka-Band," 14th European Conference on Antennas and Propagation (EuCAP 2020 Mar. 15, 2020, 2020 5 pages.

(Continued)

*Primary Examiner* — Robert Karacsony
(74) *Attorney, Agent, or Firm* — Jordan IP Law, LLC

(57) ABSTRACT

A transmitarray cell (105) comprises a first antenna element (105*a*) adapted to switching between two phase states, a second antenna element (105*b*) adapted to switching between two other phase states and between two circular polarization directions and a coupler (201) coupling the first antenna element to the second antenna element.

13 Claims, 4 Drawing Sheets

(56) References Cited

OTHER PUBLICATIONS

F. Diaby et al., “2 Bit Reconfigurable Unit-Cell and Electronically Steerable Transmitarray at Ka-Band,” IEEE Transactions on Antennas and Propagation, vol. 68, No. 6, Jun. 2020, pp. 5003-5008.

* cited by examiner

TRANSMITARRAY ANTENNA CELL

FIELD

The present disclosure generally concerns electronic devices. The present disclosure more particularly concerns the field of transmitarray antennas.

BACKGROUND

Among the different existing radio communication antenna technologies, so-called "transmitarray" radio antennas are particularly known. These antennas generally comprise a plurality of elementary cells, each comprising a first antenna element irradiated by an electromagnetic field emitted by one or a plurality of sources, a second antenna element transmitting a modified signal to the outside of the antenna, and a coupling element between the first and second antenna elements.

For applications, for example, such a satellite communication ("SatCom"), it would be desirable to have reconfigurable transmitarray antennas enabling to select, for each cell, a phase shift value from among a plurality of predefined values, while using a minimum number of electronic components. It would further be desirable to be able to dynamically modify the polarization of the radiated wave. This would in particular enable to decrease costs and to improve the efficiency of transmitarray antennas, as well as to increase the polarization flexibility for communications with one or a plurality of satellites.

SUMMARY

There is a need to improve existing transmitarray antennas.

An embodiment overcomes all or part of the disadvantages of known transmitarray antennas.

An embodiment provides a transmitarray cell comprising:

- a first antenna element adapted to switching between two phase states;
- a second antenna element adapted to switching between two other phase states and between two circular polarization directions; and
- a coupler coupling the first antenna element to the second antenna element.

According to an embodiment:

- the first antenna element is located on a first surface of the cell;
- the second antenna element is located on a second surface of the cell, opposite to the first surface; and
- the coupler is located between the first and second surfaces of the cell.

According to an embodiment, the first antenna element comprises:

- a conductive frame;
- an output terminal, located inside of the conductive frame; and
- first and second switching elements coupling the conductive frame to the output terminal.

According to an embodiment:

- a first conduction terminal of the first switching element is connected to the conductive frame;
- a second conduction terminal of the first switching element is connected to the output terminal of the first antenna element;
- a first conduction terminal of the second switching element is connected to the frame by a first delay line adapted to introducing, on the output terminal of the first antenna element, a phase shift equal to approximately 90° with respect to an incident signal on the first antenna element; and
- a second conduction terminal of the second switching element is connected to the output terminal of the first antenna element.

According to an embodiment, the output terminal of the first antenna element is connected to an input terminal of the coupler by a first conductive via.

According to an embodiment, the coupler comprises first, second, third, and fourth output terminals, the coupler being adapted to introducing, on its second and fourth output terminals, a phase shift equal to approximately 90° with respect to a signal present on its first and third output terminals.

According to an embodiment, first, second, third, and fourth input terminals of the second antenna element are respectively connected to the first, second, third, and fourth output terminals of the coupler by four second conductive vias.

According to an embodiment, the second antenna element comprises:

- a conductive ring; and
- third, fourth, fifth, and sixth switching elements comprising first conduction terminals respectively connected to the first, second, third, and fourth input terminals of the second antenna element and second conduction terminals respectively connected to first, second, third, and fourth points of the conductive ring.

According to an embodiment, the first and third points of the conductive ring are diametrically opposite and the second and fourth points of the conductive ring are diametrically opposite, the diameter having the first and third points located thereon being orthogonal to the diameter having the second and fourth points located thereon.

According to an embodiment, the second antenna element further comprises second, third, fourth, and fifth delay lines, each introducing a phase shift equal to approximately 180° and each comprising a first end connected to one of the first, second, third, and fourth input terminals of the second antenna element and a second end connected to one of the first, second, third, and fourth points of the conductive ring.

According to an embodiment, the second antenna element further comprises second and third delay lines, each introducing a phase shift equal to approximately 180°, the second delay line connecting the second point of the conductive ring to the fourth point of the conductive ring and the third delay line connecting the first point of the conductive ring to the third point of the conductive ring.

An embodiment provides a transmit array comprising a plurality of cells such as described.

An embodiment provides an antenna comprising a transmit array such as described and at least one source configured to irradiate a surface of the array.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, embodiments of a cell for a transmitarray antenna will be described hereafter. The structure and the operation of the primary source(s) of the antenna, intended to irradiate the transmit array, will however not be detailed, the described embodiments being compatible with all or most of the known primary irradiation sources for a transmitarray antenna. As an example, each primary source is capable of generating a beam of generally conical shape irradiating all or part of the transmit array. Each primary source for example comprises a horn antenna. As an example, the central axis of each primary source is substantially orthogonal to the mean plane of the array.

Further, the described transmit array manufacturing methods will not be detailed, the forming of the described structures being within the abilities of those skilled in the art based on the indications of the present description, for example by implementing usual printed circuit manufacturing techniques.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms “front”, “rear”, “top”, “bottom”, “left”, “right”, etc., or relative positions, such as terms “above”, “under”, “upper”, “lower”, etc., or to terms qualifying directions, such as terms “horizontal”, “vertical”, etc., it is referred, unless specific otherwise, to the orientation of the drawings, it being understood that, in practice, the described devices may be oriented differently.

Unless specified otherwise, the expressions “about”, “approximately”, “substantially”, and “in the order of” signify within 10%, preferably within 5%, or, when angular values are concerned, within 10°, preferably within 5°.

Figure 1:
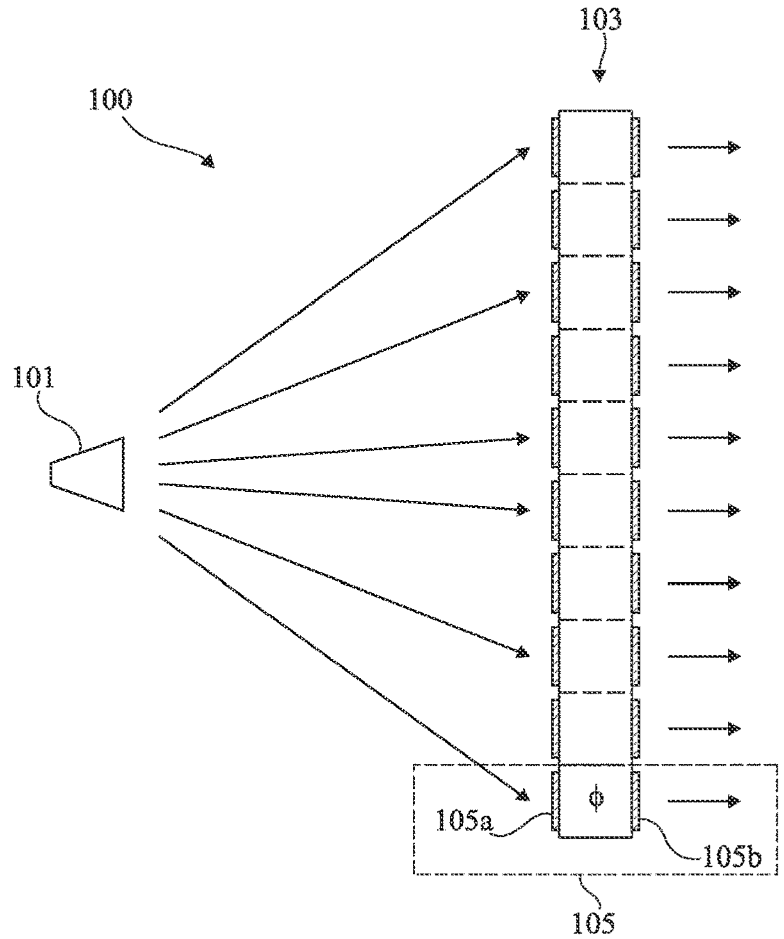
FIG. 1 is a simplified side view of an example of a transmitarray antenna of the type to which the described embodiments apply as an example.

FIG. 1 is a simplified side view of an example of a transmitarray antenna 100 of the type to which the described embodiments apply as an example.

Antenna 100 typically comprises one or a plurality of primary sources 101 (a single source 101, in the shown example) irradiating a transmit array 103. Source 101 may have any polarization, for example, linear or circular. Array 103 comprises a plurality of elementary cells 105, for example, arranged in an array of rows and of columns. Each cell 105 typically comprises a first antenna element **105*a*, located on the side of a first surface of array 103 located opposite primary source 101, and a second antenna element 105*b*, located on the side of a second surface of the array opposite to the first surface. The second surface of array 103 for example faces a transmission medium of antenna 100**.

Each cell 105 is capable, in transmit mode, of receiving an electromagnetic radiation on its first antenna element **105*a* and of retransmitting this radiation from its second antenna element 105*b*, for example by introducing a known phase shift $\phi$. In receive mode, each cell 105 is capable of receiving an electromagnetic radiation on its second antenna element 105*b* and of retransmitting this radiation from its first antenna element 105*a*** with the same phase shift $\phi$.

The characteristics of the beam generated by antenna 100, and particularly its shape (or profile) and its maximum transmission direction (or pointing direction), depend on the values of the phase shifts respectively introduced by the different cells 105 of array 103.

Transmitarray antennas have the advantages, among others, of having a good power efficiency, and of being relatively simple, inexpensive, and low-bulk. This is particularly due to the fact that transmit arrays may be formed in planar technology, generally on a printed circuit.

Reconfigurable transmitarray antennas 103 are here more particularly considered. Transmit array 103 is called reconfigurable when elementary cells 105 are individually electronically controllable to have their phase shift value $\phi$ modified, which enables to dynamically modify the characteristics of the beam generated by the antenna, and particularly to modify its pointing direction without mechanically displacing the antenna or a portion of the antenna by means of a motor-driven element.

Figure 2:
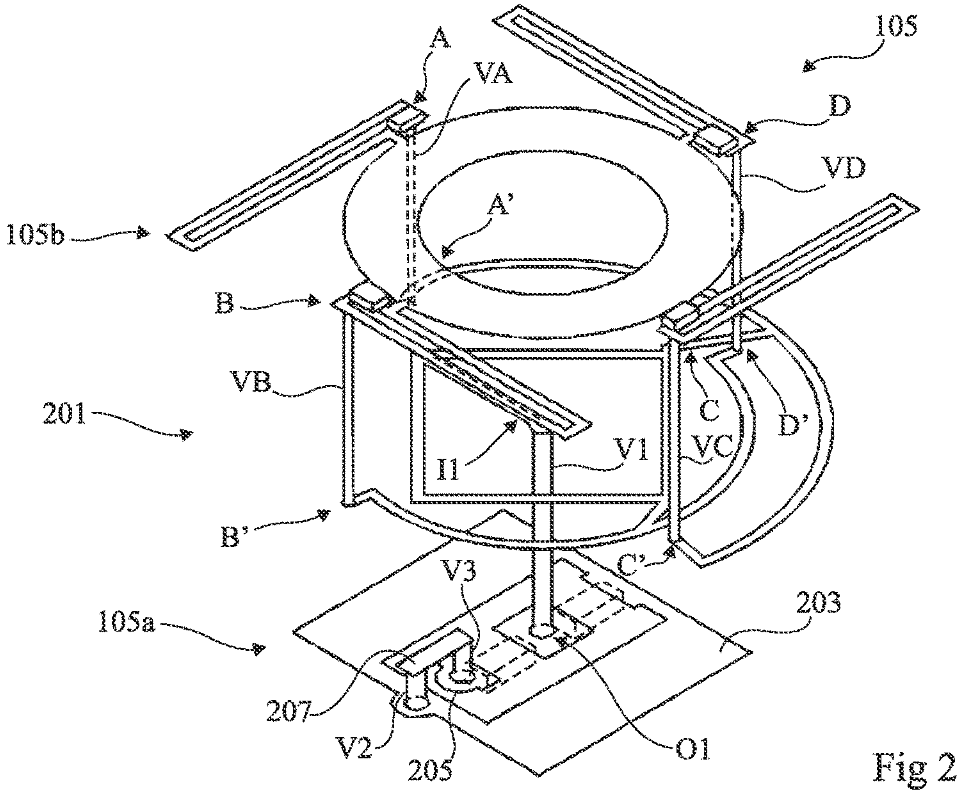
FIG. 2 is a partial simplified perspective view of a cell of a transmitarray antenna according to a first embodiment.

FIG. 2 is a partial simplified perspective view of one of the cells 105 of the antenna 100 with a transmit array 103 of FIG. 1 according to a first embodiment.

The structure of the cell 105 illustrated in FIG. 2 may for example be formed in monolithic fashion. As a variant, this structure may for example be obtained by stacking of distinct modules, these modules being for example separated by air or by one or a plurality of dielectric materials.

According to this embodiment, cell 105 further comprises first and second antenna elements **105*a* and 105*b*, a coupler 201. In the shown example, coupler 201 has a substantially planar structure interposed between antenna elements 105*a* and 105*b* and parallel to these elements. In this example, an output terminal O1 of first antenna element 105*a* is connected to an input terminal I1 of coupler 201 by a conductive via V1. Further, in this example, the input terminals A, B, C, and D of second antenna element 105***b* are respectively connected to output terminals A', B', C', and D' of coupler 201 by conductive vias VA, VB, VC, and VD. The terminal I1 of coupler 201 is located vertically in line with the terminal O1 of first antenna element 105*a* and the terminals A, B, C, and D of second antenna element 105*b* are respectively located vertically in line with the terminals A', B', C', and D' of coupler 201.

In the shown example, first antenna element 105*a* comprises a planar conductive frame 203 and a conductive region 205 located inside of frame 203. In this example, frame 203 and region 205 are coplanar and connected together by a conductive track 207, located outside of the plane of frame 203, and by two conductive vias V2 and V3. More precisely, via V2 extends vertically from a side of frame 203 to an end of track 207 and via V3 extends vertically from conductive region 205 to the other end of track 207.

Figure 3:
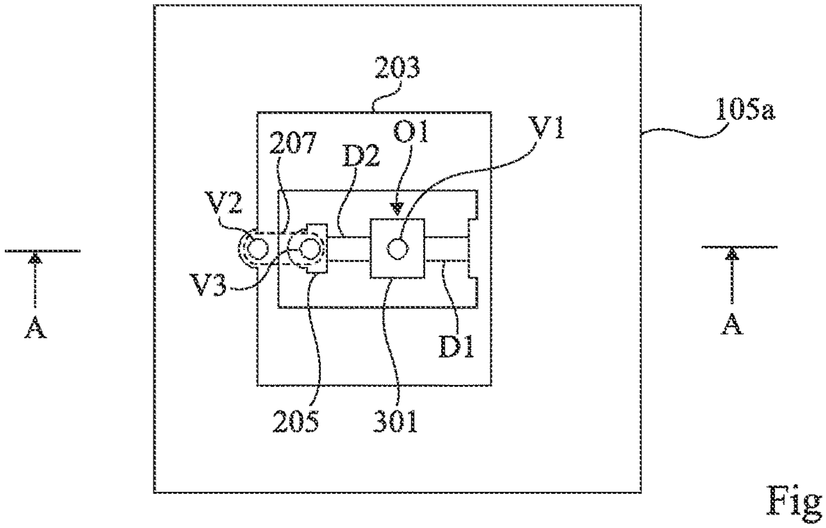
FIG. 3 is a partial simplified top view of a first antenna element of the transmitarray antenna cell according to the first embodiment.
Figure 4:
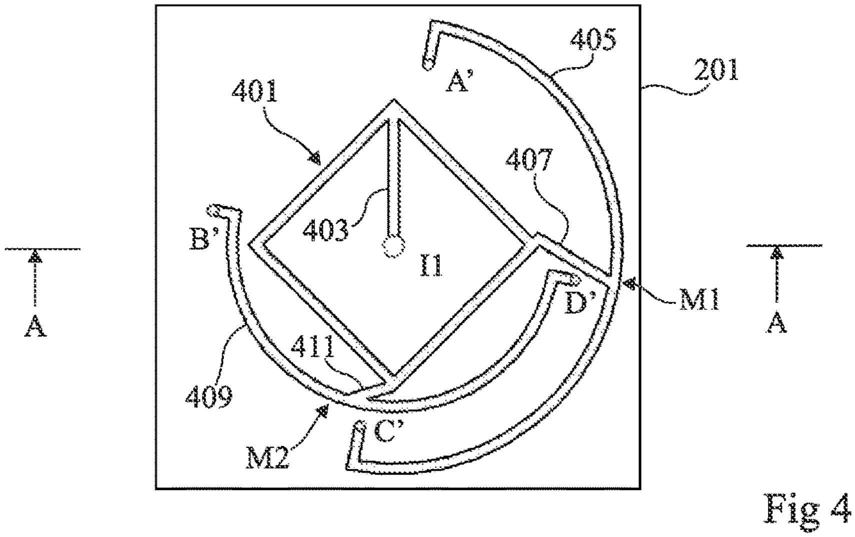
FIG. 4 is a partial simplified top view of a coupler between the first and second antenna elements of the transmitarray antenna cell according to the first embodiment.
Figure 5:
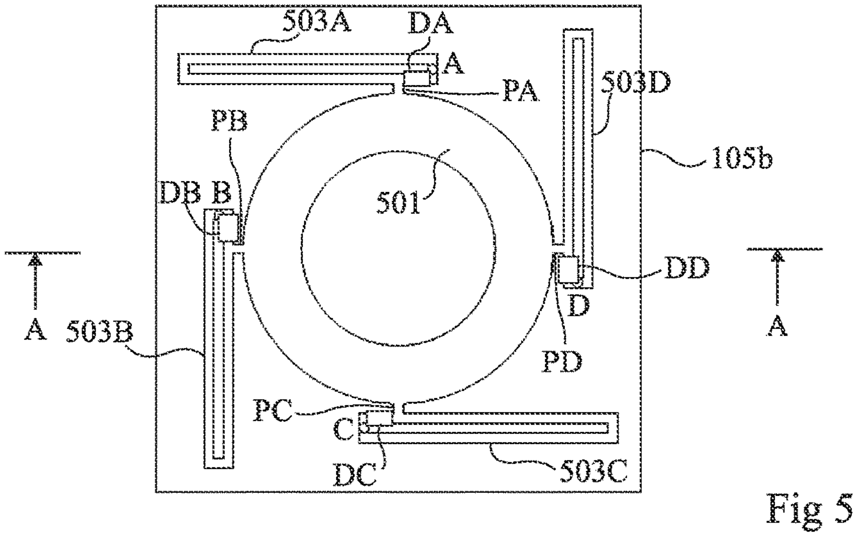
FIG. 5 is a partial simplified top view of a second antenna element of the transmitarray antenna cell according to the first embodiment.

The structures and functions of the first antenna element 105*a*, of the coupler 201, and of the second antenna element 105*b* of cell 105 are described in further detail hereafter in relation with FIGS. 3 to 5.

FIG. 3 is a partial simplified top view of the first antenna element 105*a* of the cell 105 of the antenna 100 with a transmit array 103 according to the first embodiment.

In the shown example, first antenna element 105*a* comprises a conductive region 301 located inside of conductive frame 203 and in contact with conductive via V1. Conductive region 301 for example corresponds to the output terminal O1 of first antenna element 105*a*. In this example, conductive region 301 is coupled to conductive frame 203 by a switching element D1, or switch, having a conduction terminal for example in contact with region 301 and having another conduction terminal for example in contact with frame 203.

In the shown example, conductive region 301 is further coupled to conductive region 205 by another switching element D2, having a conduction terminal for example in contact with region 301 and having another conduction terminal for example in contact with region 205.

As an example, switching elements D1 and D2 are diodes, for example, PIN ("Positive Intrinsic Negative") diodes, microelectromechanical switches ("MEMS"), varactors, etc.

In operation, when an electromagnetic field irradiates cells 105 of transmit array 103, a corresponding signal is captured by the conductive frame 203 of first antenna element 105*a*. Switches D1 and D2 are controlled in opposition, that is, so that, if one of switches D1, D2 is on, the other switch D2, D1 is off. In a case where switch D1 is on and where switch D2 is off, the signal captured by frame 203 is transmitted to coupler 201 with a substantially zero phase shift φ1.

However, in a case where switch D2 is on and where switch D1 is off, the phase shift φ1 between the signal captured by frame 203 and the signal transmitted to coupler 201 is non-zero. In this case, the phase shift φ1 introduced between the signals is for example a function, in particular, of the length of conductive track 207 and of vias V2, V3 (FIG. 2), track 207 acting as a delay line for the signal transmitted to coupler 201.

As an example, track 207 and vias V2, V3 form a conduction path having a total length adjusted so that the phase shift φ1 introduced when switch D2 is on is equal to approximately 90° (π/2). The phase shift introduced by via V1 is not to be considered since it is the same in both configurations of antenna element 105*a*.

More generally, according to this embodiment, first antenna element 105*a* is adapted to switching between two phase states φ1 (0° and 90° in this example).

As an example, first antenna element 105*a* is similar to what is described in U.S. Pat. No. 10,680,329.

FIG. 4 is a partial simplified top view of coupler 201 between the first and second antenna elements 105*a* and 105*b* of the cell 105 of the antenna 100 with a transmit array 103 according to the first embodiment.

In the shown example, the input terminal I1 of coupler 201 is located at the center of a square 401, or frame, formed by four conductive lines. Terminal I1 is, in this example, coupled to one of the corners of frame 401 by a conductive track 403 corresponding to a half-diagonal of the square.

In the shown example, the output terminals A', B', C', and D' of coupler 201 are located outside of square 401. Terminals A', B', C', and D' are approximately, in this example, located on the perimeter of a circle having a center I1 and regularly spaced apart along this perimeter. More precisely, in the shown example, terminal A' is diametrically opposite to terminal C' and terminal B' is diametrically opposite to terminal D', the diameter having terminals A', I1, and C' located thereon being substantially orthogonal to the diameter having terminals B', I1, and D' located thereon.

In the shown example, terminals A' and C' are connected together by a conductive track 405 forming a portion of an arc of a circle, substantially corresponding to a half arc of a circle in this example. A midpoint M1 of track 405 is connected, by a conductive track 407, to an angle of square 401 adjacent to the angle having track 403 connected thereto. Terminals A' and C' are substantially equidistant from terminal I1, that is, terminals A' and C' are separated from terminal I1 by conduction paths having substantially equal lengths. Thus, the signals present at output terminals A' and C' of coupler 201 have with respect to each other a substantially zero phase shift.

Similarly, terminals B' and D' are connected together by another conductive track 409 forming a portion of an arc of a circle, substantially corresponding to a half arc of a circle. A midpoint M2 of track 409 is connected, by a conductive track 411, to an angle of square 401 adjacent to the angle having track 403 connected thereto. Terminals B' and D' are substantially equidistant from terminal I1, that is, terminals B' and D' are separated from terminal I1 by conduction paths having substantially equal lengths. Thus, the signals present at output terminals B' and D' of coupler 201 have with respect to each other a substantially zero phase shift.

In the shown example, the conduction path separating each of terminals B' and D' from terminal I1 is longer than the conduction path separating each of terminals A', C' from terminal I1. More precisely, in this example, the length of the conduction path separating terminals B' and D' from terminal I1 is greater, by a length substantially equal to a side length of the square formed by square 401, than the length of the conduction path separating terminals A' and C' from terminal I1. This enables to introduce a phase shift φ2 between the signals present at terminals A', C' on the one hand, and the signals present at terminals B', D' on the other hand. As an example, the dimensions of square 401 are adjusted so that phase shift φ2 is equal to approximately 90°.

Coupler 201 further performs a power division of the signal present on its input I1. In the shown example, the signal present at each output A', B', C', D' of coupler 201 has a power lower, by a factor substantially equal to four, than the power of the signal present on input I1.

In this example, coupler 201 is a passive element, that is, coupler 201 comprises no active electric component. Coupler 201 preferably only comprises conductive tracks.

FIG. 5 is a partial simplified top view of the second antenna element 105*b* of the cell 105 of the antenna 100 with a transmit array 103 according to the first embodiment.

In the shown example, second antenna element 105*b* comprises a conductive ring 501 of circular shape and substantially planar. As a variant, the ring may be replaced with a disk- or square-shaped conductive region that may have cut corners. Ring 501 for example enables the second antenna element 105*b* of cell 105 to emit an electromagnetic radiation towards the outside of antenna 100. In this example, each input terminal A, B, C, D of the second antenna element is coupled to a point PA, PB, PC, PD of ring 501. Points PA, PB, PC, PD are for example regularly distributed on the contour of ring 501. More precisely, in the shown example, point PA is diametrically opposite to point PC and point PB is diametrically opposite to point PD, the diameter having points PA and PC located thereon being substantially orthogonal to the diameter having points PB and PD located thereon.

In the shown example, each input terminal A, B, C, D is coupled to point PA, PB, PC, PD by a switching element or switch DA, DB, DC, DD. Each terminal A, B, C, D is further connected to point PA, PB, PC, PD by a conductive track 503A, 503B, 503C, 503D located outside of ring 501.

In operation, when switch DA, DB, DC, DD is in the off state, the signal present on the associated input A, B, C, D is transmitted to the point PA, PB, PC, PD of ring 501 via the corresponding conductive track 503A, 503B, 503C, 503D. This enables to introduce a phase shift φ3 between the signal present on input A, B, C, D and the signal present at the point PA, PB, PC, PD of ring 501. As an example, the length of conductive tracks 503A, 503B, 503C, and 503D is adjusted so that phase shift φ3 is, when switch DA, DB, DC, DD is off, equal to approximately 180°.

However, when switch DA, DB, DC, DD is in the on state, the signal present on the associated input A, B, C, D is directly transmitted to ring 501 via a conduction path having a substantially negligible length with respect to that of tracks 503A, 503B, 503C, and 503D. In other words, each switch DA, DB, DC, DD enables to short-circuit the associated track 503A, 503B, 503C, 503D. The phase shift φ3 of the signal present at the point PA, PB, PC, PD of ring 501 with respect to the signal present on input A, B, C, D is in this case substantially zero.

More generally, according to this embodiment, second antenna element 105*b* is adapted to switching between two phase states φ3 (0° and 180° in this example). Due in particular to the arrangement of points PA, PB, PC, and PD on ring 501, second antenna element 105*b* further enables to switch between two states or circular polarization directions, respectively right-hand (clockwise direction, from the point of view of source 101) and left-hand (counterclockwise direction, from the point of view of source 101).

More precisely, second antenna element 105*b*, and thus cell 105, radiates an electromagnetic field having a right-hand circular polarization when:

- the signal at point PA has, with respect to the signal at point PD, a phase shift equal to 90°;
- the signal at point PD has, with respect to the signal at point PC, a phase shift equal to 90°;
- the signal at point PC has, with respect to the signal at point PB, a phase shift equal to 90°; and
- the signal at point PB has, with respect to the signal at point PA, a phase shift equal to 90°.

However, second antenna element 105*b*, and thus cell 105, radiates an electromagnetic field having a left-hand circular polarization when:

- the signal at point PD has, with respect to the signal at point PA, a phase shift equal to 90°;
- the signal at point PC has, with respect to the signal at point PD, a phase shift equal to 90°;
- the signal at point PB has, with respect to the signal at point PC, a phase shift equal to 90°; and
- the signal at point PA has, with respect to the signal at point PB, a phase shift equal to 90°.

Generally, the position of points PA, PB, PC, and PD as well as the phase shift values (more or less 90°) between two successive points determine the flow direction of the current in ring 501, and thus the polarization state of the radiated field.

As a variant, tracks 503A, 503B, 503C, and 503D may be replaced with other structures, for example, structures comprising delay lines coupled to so-called "local" elements such as capacitors, to decrease the bulk of second antenna element 105*b*.

Figure 6:
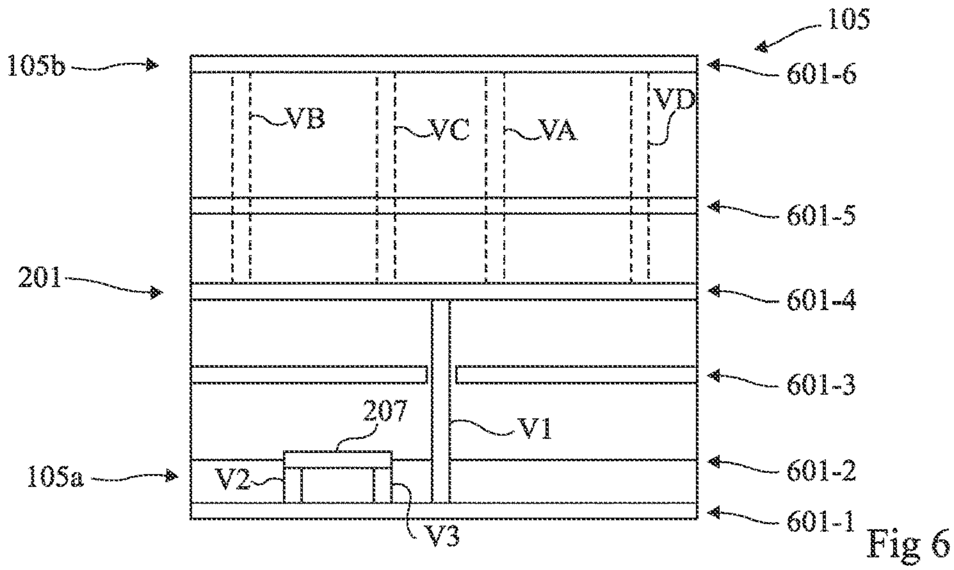
FIG. 6 is a partial simplified side cross-section view of the transmitarray antenna cell according to the first embodiment.

FIG. 6 is a partial simplified side cross-section view, along plane AA of FIGS. 3 to 5, of the cell 105 of the antenna 100 with a transmit array 103 according to the first embodiment.

Cell 105 is for example formed in a printed circuit board comprising a stack of metallization levels 601 separated from one another by dielectric layers. In the shown example, cell 105 more precisely comprises six metallization levels 601 1, 601 2, 601 3, 601 4, 601 5, and 601 6.

In this example:

- conductive frame 203 and conductive regions 205 and 301 are formed in level 601-1;
- conductive track 207 is formed in level 601-2;
- a ground plane of first antenna element 105*a* is formed in level 601-3;
- coupler 201 is formed in level 601-4;
- a ground plane of second antenna element 105*b* is formed in level 601-5; and
- conductive ring 501 and conductive tracks 503A, 503B, 503C, and 503D are formed in level 601-6.

In the shown example, conductive via V1 extends vertically from level 601-1 to level 601-4 by crossing level 601-3 without contacting it. Further, conductive vias V1, V2, V3, and V4 extend vertically from level 601-4 to level 601-6 by crossing level 601-5 without contacting it.

Although this has not been shown in FIG. 6, levels of power supply and control of switches D1, D2, DA, DB, DC, and DD are formed in the stack, for example, inside of levels 601 or between levels 601. As an example:

- a level of power supply and control of switches D1 and D2 may be provided inside of level 601-2 or between levels 601-2 and 601-3; and
- another level of power supply and control of switches DA, DB, DC, and DD may be provided between levels 601-5 and 601-6.

Figure 7:
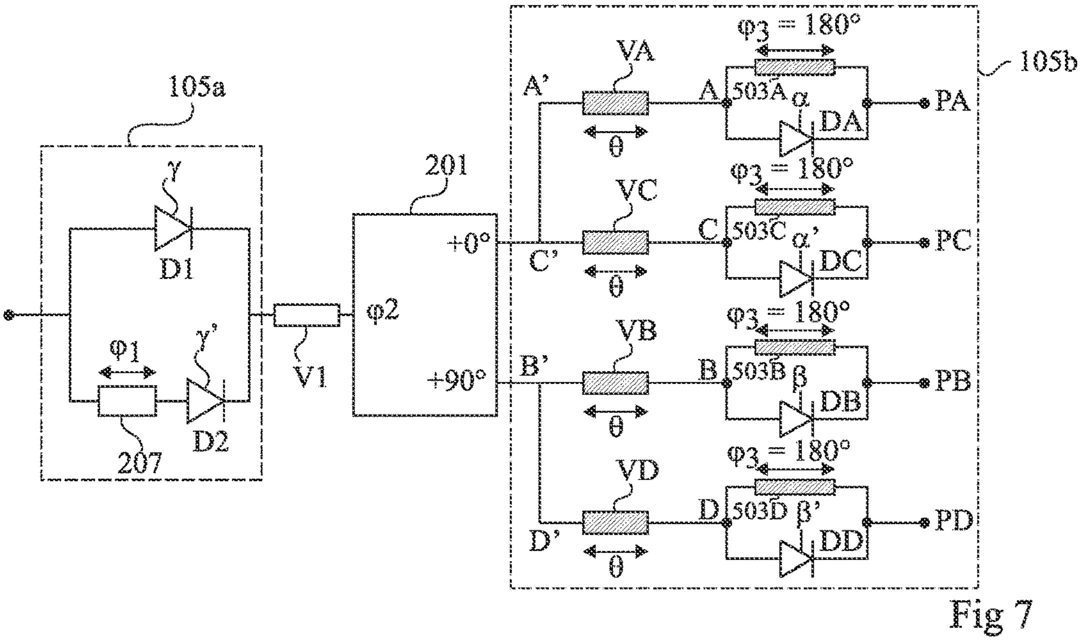
FIG. 7 is an electric diagram equivalent to the transmitarray antenna cell according to the first embodiment.

FIG. 7 is an electric diagram equivalent to the cell 105 of the antenna 100 with a transmit array 103 according to the first embodiment.

In the shown example, the switches D1 and D2 of first antenna element 105*a* are PIN diodes current-controlled by signals γ and γ', respectively. As an example, signals γ, γ' may be likened to binary signals having first and second levels "0" and "1", respectively correspond to off and on states of the associated diode D1, D2. Signal γ' for example corresponds to the opposite of signal γ, so that diode D1 is off when diode D2 is on, and conversely.

Similarly, the switches DA, DB, DC, and DD of second antenna element 105*b* are for example four PIN diodes current-controlled by signals α, β, α', and β', respectively. As an example, signals α, β, α', and β' may be likened to binary signals having first and second levels, for example, noted "0" and "1", respectively corresponding to off and on states of the associated diode DA, DB, DC, DD. Signal α' for example corresponds to the opposite of signal α and signal β' for example corresponds to the opposite of signal β, so that:

- diode DA is off when diode DC is on, and conversely; and
- diode DB is off when diode DD is on, and conversely.

One may advantageously use only three independent signals γ, α, and β to control the six diodes D1, D2, DA, DB, DC, and DD of cell 105*a*. This enables to simplify the diode control circuits.

In the shown example, each of vias VA, VB, VC, VD substantially introduces a same phase shift θ of the signals present at terminals A, B, C, and D with respect to the signals present at terminals A', B', C', and D'.

Further, each conductive track 503A, 503B, 503C, 503D behaves as a delay line adapted to introducing the 180° phase shift φ3 between the signal present on terminal A, B, C, D and the signal present at point PA, PB, PC, PD when diode DA, DB, DC, DD is off.

By independently controlling the levels of signals γ, γ', α, β, α', and β', one can thus advantageously obtain, at the output of each cell 105 of antenna 100, four phase states ϕ and two circular polarization states (left-hand and right-hand). These states are detailed in the following table. In this table:

- a "0" corresponds to the low state of control signal γ, γ', α, β, α', β' of the associated diode D1, D2, DA, DB, DC, DD, the diode being in this case off; and
- a "1" corresponds to the high state of control signal γ, γ', α, β, α', β' of the associated diode D1, D2, DA, DB, DC, DD, the diode being in this case on.

TABLE 1

| D1 | D2 | φ1 | DA | DB | DC | DD | ϕ | Polarization |
|---|---|---|---|---|---|---|---|---|
| 1 | 0 | 0° | 1 | 1 | 0 | 0 | 0° | right-hand |
| 0 | 1 | 90° | 1 | 1 | 0 | 0 | 90° | right-hand |
| 1 | 0 | 0° | 0 | 0 | 1 | 1 | 180° | right-hand |
| 0 | 1 | 90° | 0 | 0 | 1 | 1 | 270° | right-hand |
| 1 | 0 | 0° | 1 | 0 | 0 | 1 | 0° | left-hand |
| 0 | 1 | 90° | 1 | 0 | 0 | 1 | 90° | left-hand |
| 1 | 0 | 0° | 0 | 1 | 1 | 0 | 180° | left-hand |
| 0 | 1 | 90° | 0 | 1 | 1 | 0 | 270° | left-hand |

Figure 8:
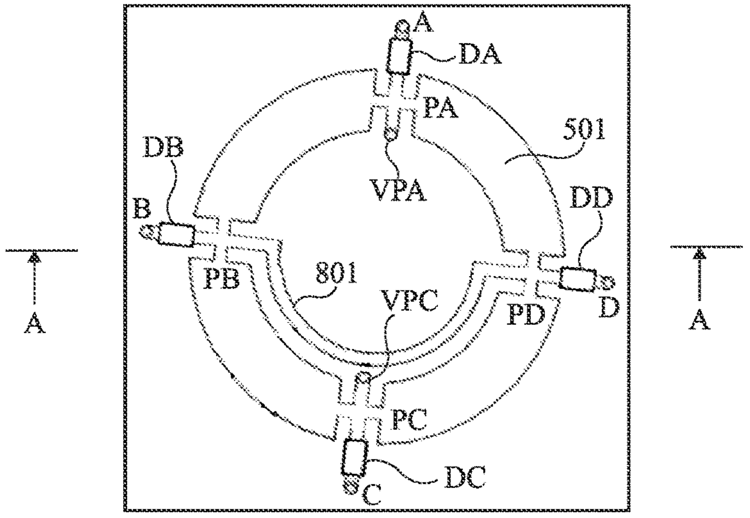
FIG. 8 is a partial simplified top view of a portion of the second antenna element of the transmitarray antenna cell according to a second embodiment.

FIG. 8 is a partial simplified top view of a portion of the second antenna element 105*b* of the cell 105 of the antenna 100 with a transmit array 103 according to a second embodiment.

The second embodiment of cell 105 differs from the first embodiment mainly in that second antenna element 105*b* is deprived of conductive tracks 503A, 503B, 503C, and 503D connected between terminals A, B, C, and D and the points PA, PB, PC, and PD of conductive ring 501. More precisely, in the shown example, terminals A, B, C and D are respectively coupled to points PA, PB, PC, and PD by switches DA, DB, DC, and DD only.

In this example, points PB and PD are connected to a conductive track 801 located inside of ring 501. Conductive track 801 and ring 501 are for example coplanar. In operation, switches DB and DD are controlled in opposition. Track 801 thus behaves as a delay line enabling to introduce a phase shift φ, for example, equal to approximately 180°, between:

- the signal present at point PD and the signal present at point PB, when switch DB is on and switch DD is off; and
- the signal present at point PB and the signal present at point PD, when switch DD is on and switch DB is off.

In the shown example, the points PA and PC of ring 501 are connected to conductive vias VPA and VPC.

Figure 9:
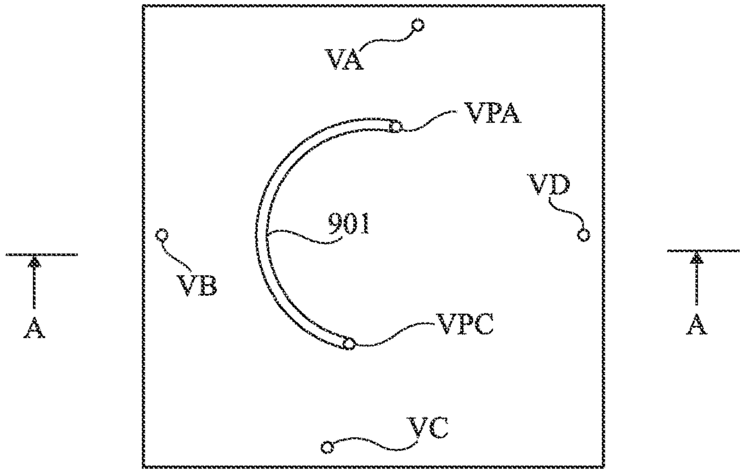
FIG. 9 is a partial simplified top view of another portion of the second antenna element of the transmitarray antenna cell according to the second embodiment.

FIG. 9 is a partial simplified top view of another portion of the second antenna element 105*b* of the cell 105 of the antenna 100 with a transmit array 103 according to the second embodiment. The structure of FIG. 9 is located in a plane different from that comprising the structure of FIG. 8.

In the shown example, vias VPA and VPC are connected together by a conductive track 901. In operation, switches DA and DC are controlled in opposition. Track 901 thus behaves as a delay line enabling in this example to introduce the phase shift φ4 between:

- the signal present at point PC and the signal present at point PA, when switch DA is on and switch DC is off; and
- the signal present at point PA and the signal present at point PC, when switch DC is on and switch DA is off.

Figure 10:
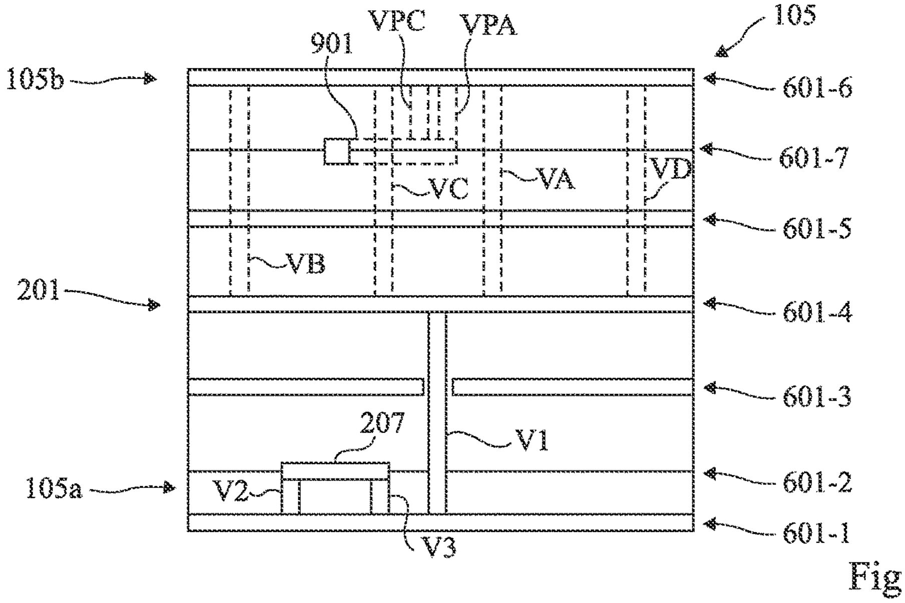
FIG. 10 is a partial simplified side cross-section view of the transmitarray antenna cell according to the second embodiment.

FIG. 10 is a partial simplified side cross-section view of the cell 105 of the antenna 100 with a transmit array 103 according to the second embodiment.

According to this embodiment, cell 105 is for example formed in a printed circuit board comprising a stack of seven metallization levels 601. More precisely, in the shown example, the printed circuit board further comprises metallization levels 601-1, 601-2, 601-3, 601-4, 601-5, and 601-6, a metallization level 601-7 interposed between levels 601-5 and 601-6. Conductive track 901 is, in this example, formed in level 601-7.

Although this has not been shown in FIG. 10, levels of power supply and control of switches D1, D2, DA, DB, DC, and DD are formed in the stack, for example, inside of levels 601 or between levels 601. As an example:

- a level of power supply and control of switches D1 and D2 may be provided inside of level 601-2 or between levels 601-2 and 601-3; and
- another level of power supply and control of switches DA, DB, DC, and DD may be provided inside of level 601-7, between levels 601-5 and 601-7 or between levels 601-7 and 601-6.

Figure 11:
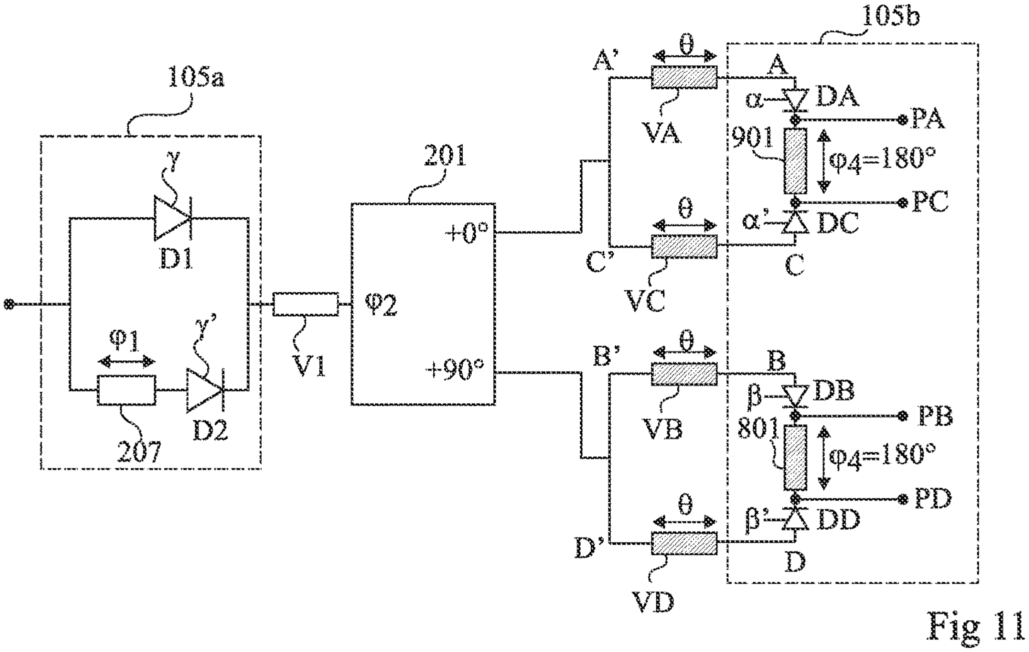
FIG. 11 is an electric diagram equivalent to the transmitarray antenna cell according to the second embodiment.

FIG. 11 is an electric diagram equivalent to the cell 105 of the antenna 100 with a transmit array 103 according to the second embodiment.

The diagram of FIG. 11 differs from the diagram of FIG. 7 mainly in that:

- conductive track 801 is adapted to introducing the 180° phase shift φ4 between the signals present at points PA and PC; and
- conductive track 901 is adapted to introducing the 180° phase shift φ4 between the signals present at points PB and PD.

As for the first embodiment, one may advantageously obtain, at the output of each cell 105 of antenna 100, four phase states ϕ and two circular polarization states (left-hand and right-hand). These states are identical to those detailed in Table 1.

As compared with the first embodiment discussed in relation with FIGS. 2 to 7, the second embodiment has the advantage of comprising no conductive tracks 503A, 503B, 503C, and 503D located close to ring 501. This particularly enables to avoid disturbing the signal transmitted by ring 501 when a current flows through one or a plurality of conductive tracks 503A, 503B, 503C, 503D.

Generally, the previously-described embodiments of cell 105 advantageously enable to obtain four phase states ϕ and to provide the possibility of reconfiguring the radiated polarization. These advantages are further obtained without the use of crossed linear polarization cells in transmit array 103.

Another advantage of the described embodiments lies in the fact that they implement a minimum number of switches, in the case in point six switches only. This enables to obtain a cell 105 having a structure which is simple, inexpensive, and with a good power efficiency. In particular, the described embodiments enable to form transmit arrays having decreased power losses with respect, in particular, to a case where cells having vertical and horizontal polarizations would be combined to re-create a field having a circular polarization.

Various embodiments and variants have been described. Those skilled in the art will understand that certain features of these various embodiments and variants may be combined, and other variants will occur to those skilled in the art. In particular, the shape of the frame 203 of first antenna element 105*a* may be adapted according to the polarization of source 101.

Finally, the practical implementation of the described embodiments and variants is within the abilities of those skilled in the art based on the functional indications given hereabove. In particular, the levels of the control signals of switches D1, D2, DA, DB, DC, and DD may be adapted by those skilled in the art according to the application.

What is claimed is:

1. Cell of a transmit array comprising:
- a first antenna element adapted to switching between two phase states;
- a second antenna element adapted to switching between two other phase states and between two circular polarization directions; and
- a coupler coupling the first antenna element to the second antenna element.

2. The cell according to claim 1, wherein:
- the first antenna element is located on a first surface of the cell;
- the second antenna element is located on a second surface of the cell, opposite to the first surface; and
- the coupler is located between the first and second surfaces of the cell.

3. Cell according to claim 1, wherein the first antenna element comprises:
- a conductive frame;
- an output terminal, located inside of the conductive frame; and
- first and second switching elements coupling the conductive frame to the output terminal.

4. Cell according to claim 3, wherein:
- a first conduction terminal of the first switching element is connected to the conductive frame;
- a second conduction terminal of the first switching element is connected to the output terminal of the first antenna element;
- a first conduction terminal of the second switching element is connected to the frame by a first delay line adapted to introducing, on the output terminal of the first antenna element, a phase shift equal to approximately 90° with respect to an incident signal on the first antenna element; and
- a second conduction terminal of the second switching element is connected to the output terminal of the first antenna element.

5. Cell according to claim 3, wherein the output terminal of the first antenna element is connected to an input terminal of the coupler by a first conductive via.

6. Cell according to claim 1, wherein the coupler comprises first, second, third, and fourth output terminals, the coupler being adapted to introducing, on its second and fourth output terminals, a phase shift equal to approximately 90° with respect to a signal present on its first and third output terminals.

7. Cell according to claim 6, wherein first, second, third, and fourth input terminals of the second antenna element are respectively connected to the first, second, third, and fourth output terminals of the coupler by four second conductive vias.

8. Cell according to claim 7, wherein the second antenna element comprises:
- a conductive ring; and
- third, fourth, fifth, and sixth switching elements comprising first conduction elements respectively connected to the first, second, third, and fourth input terminals of the second antenna element and second conduction terminals respectively connected to first, second, third, and fourth points of the conductive ring.

9. Cell according to claim 8, wherein the first and third points of the conductive ring are diametrically opposite and the second and fourth points of the conductive ring are diametrically opposite, the diameter having the first and third points located thereon being orthogonal to the diameter having the second and fourth points located thereon.

10. Cell according to claim 9, wherein the second antenna element further comprises second, third, fourth, and fifth delay lines, each introducing a phase shift equal to approximately 180° and each comprising a first end connected to one of the first, second, third, and fourth input terminals of the second antenna element and a second end connected to one of the first, second, third, and fourth points of the conductive ring.

11. Cell according to claim 9, wherein the second antenna element further comprises second and third delay lines, each introducing a phase shift equal to approximately 180°, the second delay line connecting the second point of the conductive ring to the fourth point of the conductive ring and the third delay line connecting the first point of the conductive ring to the third point of the conductive ring.

12. Transmit array comprising a plurality of cells according to claim 1.

13. Antenna comprising a transmit array according to claim 12 and at least one source configured to irradiate a surface of the array.

* * * * *